Jan. 1, 1946. H. J. EKLUND 2,392,133
RIVET
Filed May 18, 1940
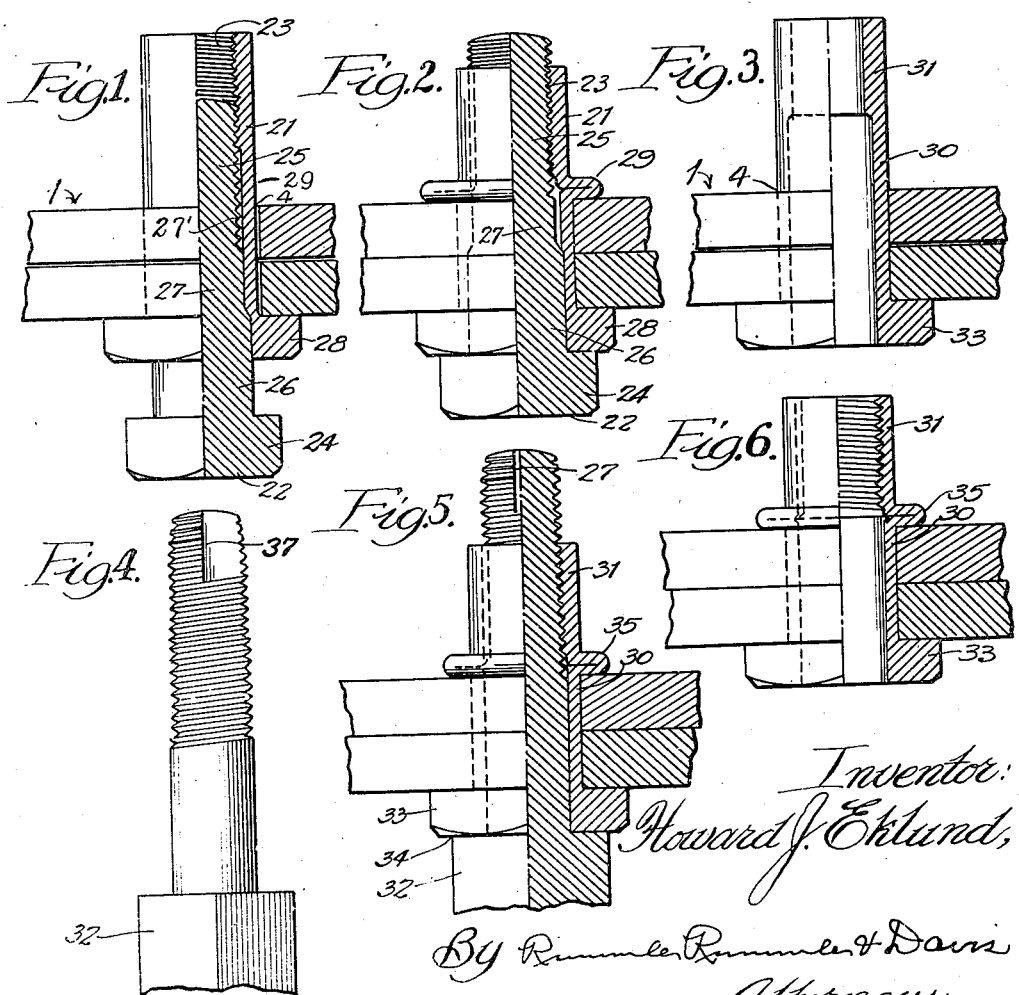
Inventor:
Howard J. Eklund,
By Rummler Rummler & Davis
Attorneys.

Patented Jan. 1, 1946

2,392,133

UNITED STATES PATENT OFFICE 2,392,133

RIVET

Howard J. Eklund, Chicago, Ill., assignor of one-half to Elmer M. Naylor, Chicago, Ill., and one-half to Rolyan Corporation, Chicago, Ill., a corporation of Illinois Application May 18, 1940, Serial No. 335,926

3 Claims. (Cl. 85—40)

This invention relates generally to gradient-set rivets and more especially to tubular rivets in which the head formed in setting the rivet is produced by bulbous expansion and upsetting of the body through interior bolt tension.

The main objects of the invention are to produce an improved form of this sort of rivet; to minimize the number of parts; to simplify the mode of assemblage and setting; to provide for selective use of the rivet, in ultimate fluid-tight solid form, or in hollow form pursuant to final backing out of the bolt core; and to provide the bolt member in form and design adapted for cutting threads for itself in the appropriately formed end portion of the rivet shell.

This invention is illustrated by the accompanying drawing, in which:

Figure 1 shows a composite rivet applied to a piece of work and ready for setting, the left half being in side elevation and the right half in axial section.

Fig. 2 is similar to Fig. 1, except that the bolt is screwed fully into the threaded end of the rivet shell and the rivet is fully set.

Fig. 3 shows a modified form of rivet shell, differing from that employed in the device of Figs. 1 and 2, mainly in that the hollow rivet shell serves alone and is formed initially with a small plain bore at its forward end portion and a larger bore throughout the rest of its length, and is adapted for bulb setting by means of a thread-cutting bolt.

Fig. 4 shows a boltlike form of thread-cutting tool used in compressive bulb setting of the rivet of Fig. 3.

Fig. 5 shows the rivet of Fig. 3 after due setting, with the setting tool (Fig. 4) about to be withdrawn.

Fig. 6 shows the rivet of Fig. 5 in place after withdrawal of the setting tool.

Referring now more in detail to the drawing and especially to Figs. 1 and 2, showing the first form, the work structure 1 comprises plates 2 and 3 containing a hole 4 for the rivet.

The rivet shown in hole 4 includes a shell 21 and a core 22. Here the shell initially is offset inwardly throughout the length of its shank relative to the bore of the head part and the forward tip portion 23 is still further offset inwardly and threaded to the forward end.

The core bolt 22 comprises a head 24 and a shank 25, the rearward part 26 of the shank nearest to the head being of comparatively large diameter, a small medial part 27 being plain and of somewhat less diameter and the rest of the shank being similar but threaded as indicated at 27'.

In order to set the rivet the shell is held stationary while the bolt is screwed forcibly into the shell, screw engagement occurring at and near the outward end of the shell. For that purpose one wrench is engaged with the rivet head 28 to hold it against turning and a second wrench is engaged with the bolt head 24 for screwing the bolt into the shell.

As the turning continues the large-diameter part of the bolt shank 26 wedgingly enters the inwardly offset shank of the shell 21 and expands the latter outwardly. This continues until the head 24 of the bolt bears against the head 28 of the shell. From then on the tensional screw action of the bolt 22 on the outer end part of the shell 21 pulls the latter inwardly toward the work whereupon bulbing occurs at 29 as indicated on Fig. 2.

Referring now to the form shown by Figs. 3, 5 and 6, the rivet is of comparably simple design, being in one piece and hollow. Here the hollow rivet shell 30 is first applied to the work as in Fig. 3. It will be noted that the cylindrical bore is initially plain throughout but somewhat restricted in gage at its forward end portion 31. In order to set this rivet a thread cutting bolt or tool 32 is inserted through the head end 33 of the rivet; and while the rivet is held against turning the tool is operated screwwise into the rivet, whereby threads are cut in the restricted part 31 of the rivet bore. As soon as the head of the tool 32 bears against the head of the rivet, as at 34, that part of the rivet shell between the restricted forward end and the face of the work tends to bulb. When the tool is further turned, an annular head 35 is definitely formed at the point or zone of bulbing as shown on Fig. 5, whereupon the tool may be removed, leaving the rivet fully set as shown by Fig. 6.

The said tool 32 is boltlike in appearance and use but is fluted lengthwise at its forward tip to form thread cutting elements 37 and to give it the character of a tap.

It is to be understood that some of the details set forth may be altered or omitted without departing from the spirit of this invention as defined by the following claims.

I claim:

1. A rivet adapted to be used where only one side of the work is accessible comprising a headed tubular member adapted to be inserted through the work and having a head engageable with the accessible side of the work, the external diameter of said tubular member being slightly less than the hole through the work and the inner end of said tubular member being internally threaded, and a screw insertable in said tubular member having a head engageable against the head of the tubular member and a threaded shank portion engageable with the threads in the tubular member, said screw having a shoulder facing away from the head and toward the threaded end of the tubular member and of slightly larger diameter than the bore of the tubular member, the threading of the screw into the tubular member expanding the shank portion of the tubular member by means of the shoulder and drawing the threaded portion of the tubular member toward the work to provide a bulb between the face of the work and the threaded portion.

2. A rivet adapted to be used where only one side of the work is accessible, comprising a headed member adapted to be inserted into a hole through the work with the head engaging the accessible or outer side of the work, said member being of slightly less diameter than the diameter of said hole and having a bore internally threaded at its inner end, and a headed screw projecting into said bore and engaging the internal threads of the member, said screw having an annular forming shoulder operable by a combined rotative and axial movement of the screw to expand the member with a spinning action to fill said hole, the head of the screw abutting the head on said member to limit the axial movement of the screw on completion of such expansion, said screw thereafter being rotatable but held against axial movement by abutment of the heads while drawing the threaded end of the member toward the work to bulb the metal between the threaded end of the member and the adjacent face of the work.

3. A rivet adapted to be used where only one side of the work is accessible, comprising a headed member adapted to be inserted into a hole through the work with the head engaging the accessible or outer side of the work, said member having a smaller bore through its inner end than through the remainder of the member, and a headed screw projecting into the bore of said member and having a thread cutting portion at its inner end operable by rotation of the screw to cut threads in the smaller bore portion of said member, said screw thereby being moved axially, such axial movement of the screw causing the thread cutting portion to pass through the inner end of the member until full threads of the screw engage the threaded portion of said member and the heads of the screw and member are in abutment, said screw thereafter being rotatable but held against axial movement by abutment of the heads while drawing the threaded end of the member toward the work to bulb the metal between the threaded end of the member and the adjacent face of the work.

HOWARD J. EKLUND.